United States Patent [19]

Bresman et al.

[11] 4,198,163
[45] Apr. 15, 1980

[54] DIFFERENTIAL LASER GYRO READOUT

[75] Inventors: Joseph M. Bresman; Harlan J. Cook, both of West Hartford, Conn.

[73] Assignee: United Technologies Corporation, Hartford, Conn.

[21] Appl. No.: 866,982

[22] Filed: Jan. 5, 1978

[51] Int. Cl.² ............................ G01B 9/02; G01P 9/00
[52] U.S. Cl. .................................................. 356/350
[58] Field of Search .................................. 356/106 LR

[56] References Cited

U.S. PATENT DOCUMENTS

| | | | |
|---|---|---|---|
| 3,862,803 | 1/1975 | Yntema et al. | 356/106 LR |
| 3,892,486 | 7/1975 | Ferrar | 356/106 LR |
| 4,000,947 | 1/1977 | Grant, Jr. | 356/106 LR |

Primary Examiner—Vincent P. McGraw
Attorney, Agent, or Firm—M. P. Williams

[57] ABSTRACT

A differential laser gyro, of the type having four modes, to define a first gyro operating with both clockwise and anticlockwise right circular polarized circulating waves, and a second gyro operating with clockwise and anticlockwise left circular polarized circulating waves, is provided with reflective optical readout paths in which the anticlockwise waves are coupled through an odd number of mirrors (or vice versa), and then through a mode-combining beam splitter, to provide two colinear beams, each including all four modes, to identical assemblies of polarization conversion and discrimination means and heterodyning detectors.

4 Claims, 1 Drawing Figure

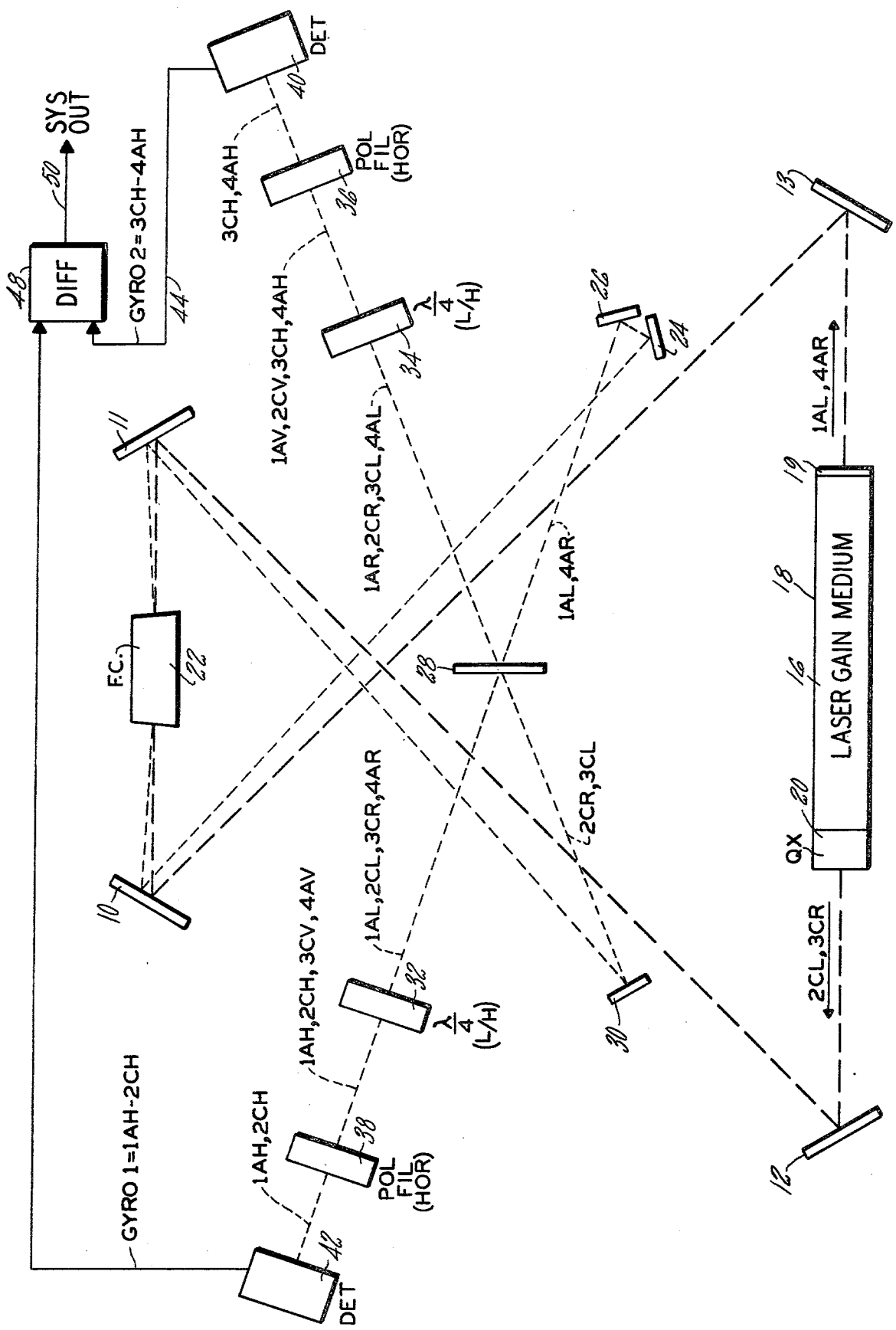

DIFFERENTIAL LASER GYRO READOUT

The invention described herein was made under or in the course of a contract with the Department of the Navy.

BACKGROUND OF THE INVENTION

1. Field of Art

This invention relates to laser gyros, and more particularly to improvements in the optical readout thereof.

2. Description of the Prior Art

The differential laser gyro, as described in U.S. Pat. No. 3,862,803, to Yntema et al, includes four modes of traveling waves, two modes being of one polarization and the other two modes being of an orthogonal polarization with respect thereto. The modes relating to each polarization represent an independent laser gyro including both clockwise and anticlockwise circulating waves. The clockwise and anticlockwise waves of one polarization are heterodyned to provide a first gyro output, and the clockwise and anticlockwise waves of the second polarization are heterodyned to provide a second gyro output. The difference between the two gyro outputs provides a differential system output, with twice the normal sensitivity and the cancellation of substantial portions of all biases and errors. As is described in the aforementioned Yntema et al patent, the four modes are caused to operate at four different frequencies by means of a quartz crystal which has an anisotropic frequency response to waves of differing polarization (such as right circularly polarized vs. left circularly polarized), which separates the two distinct gyros (one in each polarization) diversely in frequency from each other, as well as Faraday rotator (or cell) which has an anisotropic frequency response to circularly polarized waves traveling in opposite directions, causing the clockwise and anticlockwise circulating waves in each gyro to be separated by a bias frequency (as is common among nondifferential laser gyros, as well).

Since the Faraday cell requires circular polarization (in contrast with linear polarization) for its anisotropic frequency-splitting effect, it is common to operate laser gyros in circular polarization modes, rather than in plane polarization modes. Due to the inherent requirements for each mode of the circulating waves to have a continuous phase characteristic, there must be an integral number of wavelengths about the closed-loop optical path. Use of an optically active element (e.g., the quartz crystal) will force the modes to be in circular polarization rather than plane polarization because of that fact. Therefore, unless quarter wave plates are used within the laser cavity itself, the only naturally-sustainable modes in such a cavity with an optically active element are the circular polarized modes. It is possible to provide quarter wave plates on either end of the Faraday cell so that circular polarization exists within the Faraday cell with linear polarization in the remainder of the laser gyro. However, due to various perturbating effects on the modes within differential laser gyros, such as the lack of orthogonality of waves if the quarter wave plates are not perfectly aligned, it is preferable to operate laser gyros in the circular polarized modes.

In order to separate one gyro from the other, all four beams or modes (including left circular polarized anticlockwise, right circular polarized anticlockwise, left circular polarized clockwise and right circular polarized clockwise) are coupled out, and the right circularly polarized and left circularly polarized beams are separated from each other to provide distinct gyro outputs by means of polarization filtering. However, as is known, the only practical polarization filter is operative with respect to linear polarization, and not with respect to circular polarization. Therefore, it is common for differential laser gyros to employ quarter wave plates to convert the circularly polarized modes to linear polarized modes prior to separation by polarization filtering. One phenomenon of circularly polarized light is that it changes its orthogonal sense (from left circularly polarized to right circularly polarized, and vice versa) upon each reflection from a mirror. Since provision of output coupling inherently requires the use of mirrors, the polarization reversal must be accommodated so long as circularly polarized light is being coupled toward the output components. Therefore, as illustrated in U.S. Pat. No. 3,892,486 to Ferrar, it is common practice to convert the circularly polarized light to linearly polarized light before encountering the unequal member of reflections of a mode-combining beam splitter, after only an equal number of reflections have been made in the output-coupling beams, so that each independent gyro of a common polarization, including both a clockwise and an anticlockwise circulating wave, can be separated from the other gyro by means of linear polarization filters.

Some representations of laser gyros depict coupling of a portion of each of the four modes from the main laser path to readout components directly through the corner mirrors of the laser gyro itself; in some laser gyro configurations, the readout is achieved by allowing a small percentage to leak through the mirrors; that is, rather than having the mirrors be totally reflective, they are partially transmissive. This operates suitably when the polarization of the modes in the laser gyro are not significant, as in the case of two mode (nondifferential) laser gyros. However, the leakage through a mirror is usually unequal for the horizontal and vertical components of polarization, so any light transmitted through a mirror is necessarily somewhat elliptically polarized, reducing the detectible difference between right circular polarized and left circular polarized waves. Therefore, actual practice in modern differential laser gyros avoids any coupling through the main gyro mirrors since effective gyro operation requires that the mirrors be highly reflective and disposed to enhance gyro operation, rather than to serve the needs of output-coupling. Therefore, modern differential laser gyros employ reflective output coupling, typically deriving the output from slightly tilted surfaces of a component which exists in the gyro path. In such a case, the reflection of the clockwise waves is achieved from a different surface than the reflection of the counterclockwise waves; or if from the same surface, in opposite directions. And beam directors (such as mirrors, or prisms having reflective surfaces) are utilized to direct the beams into colinearity for combining so that the clockwise and counterclockwise waves of each of the two separate gyros can be brought together for detection. An example is illustrated in the aforementioned Ferrar patent.

With readout optics in which the anticlockwise waves of both gyros pass through one quarter wave plate and the clockwise waves of both gyros pass through the other quarter wave plate, perfect alignment of the quarter wave plates is required in order to provide complete orthogonality as between the two separate individual gyros so that complete separation may be made by polarization filtering. Thus, if one of the quarter wave plates is not perfectly orthogonally aligned, some of the left circularly polarized component may leak through, and some of the right circularly polarized component may be blocked (or vice versa), causing each gyro to itself be slightly diminished, and to have, in its output signal, some of the output of the other gyro. This is referred to hereinafter as "cross-talk." Additionally, due to practical limitations on real world laser components (such as the imperfection of mirrors), the circular polarizations are not perfect, but are, rather, elliptical. Adjustment of the quarter wave plates for maximum conversion of the major axis of one of the elliptical polarizations inherently will not suit the major axis of the other elliptical polarization. This there is an inherent cross-talk created when the quarter wave plates are utilized at a point in the readout optics which include just the anticlockwise waves or just the clockwise waves, respectively. The phenomenon is not limited to readout optics of the type schematically illustrated in the Ferrar et al patent, but may also exist in more modern, practical configurations such as the figure eight block configuration disclosed in U.S. Pat. No. 4,000,947 to Grant. Therein, although not described in detail, the quarter wave plates would inherently have to be inserted respectively in each of the clockwise and anticlockwise output beams, between the prisms and the beam splitter. Thus the same problems described hereinbefore with respect to the Ferrar patent will exist in the Grant patent.

A second consideration, illustrated by the readout optics disclosed in the Ferrar and Grant patents, is that the polarization filters are typically aligned mutually orthogonally for the respective separate gyros. This prevents utilization of a single optical output component package for both gyros due to their mutually orthogonal polarizations.

SUMMARY OF THE INVENTION

An object of the present invention is to reduce crosstalk between distinct, orthogonally polarized gyros in a differential laser gyro; another object is to provide modularity in the readout optics of a differential laser gyro.

According to the present invention, a differential laser gyro includes separate reflective optical readout paths for the anticlockwise modes and for the clockwise modes, respectively, between the closed-loop gyro optical path and a mode-combining beam splitter, conversion to linear polarization being achieved after all four beams are combined in the beam splitter, one of the paths to the mode-combining beam splitter having an odd number of reflections therein and the other of the paths to the mode-combining beam splitter having an even number of reflections therein, the output of the mode-combining beam splitter being passed through quarter wave plates and polarization filters oriented in the same sense with respect to both outputs of the mode-combining beam splitter.

The present invention avoids cross-talk between the independent laser gyros of different polarizations as a consequence of passing components of each through each of two separate quarter wave plates. The invention permits utilization of readout components having identical polarization orientations for both of the independent laser gyros of opposite polarization.

The foregoing and various other objects, features and advantages of the present invention will become more apparent in the light of the following detailed description of an exemplary embodiment thereof, as illustrated in the accompanying drawing.

BRIEF DESCRIPTION OF THE DRAWING

The sole FIGURE herein comprises a schematic illustration of an exemplary embodiment of the present invention.

DETAILED DESCRIPTION

Referring now to the drawing, four mirrors 10–13 define a closed-loop optical path in a figure eight configuration within which four distinct modes of circulating waves are directed. The waves are created by a laser gain medium 16, which may for instance, be a dual-isotope, helium-neon laser of the type described in the aforementioned Yntema et al patent, or other suitable source of coherent radiation. The laser gain medium 16 may be contained within a suitable structure 18 closed at either end by windows 19, 20, which may preferably be tilted slightly as to reduce normal backscattering. Or, the laser gain medium may be provided suitably within the laser path in accordance with any known technique. To provide a polarization anisotropic frequency response, a quartz crystal (Q.X.) may be provided as one of the windows 20 of the laser gain medium structure 18. The directionally anisotropic frequency response may be provided by a Faraday cell (F.C.) 22, which typically comprises a magnetic field within a suitable medium such as fused quartz, typically provided by means of a solenoid current-carrying coil wrapped about a suitable mass of quartz. In many instances, the two anisotropic responses are created by a solenoid-wound quartz crystal in a single element, as is disclosed in the prior art. The four modes of circulating waves on the paths caused by reflection between the mirrors 10–13 are depicted by dash lines in the drawing. As is known, dielectric coatings are preferred on the mirrors 10–13 since these have a very high degree of reflectivity for the desired nominal wavelength of operation, reducing a tendency to transmit plane polarization incedent at an angle to the plane of the mirror, which could tend to cause ellipticity. To maintain circularly polarized waves in a closed path, an even number of reflections is required to maintain polarization integrity; thus, an even number of mirrors 10–13 is required.

The output is derived by reflecting a small portion of the clockwise waves and of the anticlockwise waves at suitable points in the system, such as at the ends of the Faraday cell. This may be achieved by providing the end surfaces of the quartz which comprises the Faraday cell in planes which are slightly off normal from the optical axis thereof (as depicted by the dash line between the mirrors 10 and 11). This will cause a small amount of the anticlockwise modes approaching the Faraday cell 22 from the mirror 10 to be reflected back to the mirror 10 as indicated by the dotted lines, along an axis which is slightly displaced from the axis of the four modes of circulating waves. Similarly, a small portion of the clockwise modes approaching the Faraday cell 22 from the mirror 11 will be reflected from the Faraday cell back to the mirror 11, as depicted by the dotted lines, along a path which is slightly different than the path of the four modes of circulating waves. The reflected waves for output coupling (dotted lines) may be along output beams paths in the same plane as the plane of the closed-loop path defined by the mirrors 10–13, or may be reflected along output beam paths not in the plane of the closed-loop path, as described in the aforementioned Grant patent; it is immaterial to the present invention so long as the output beam paths are separate from the closed-loop path of the circulating waves, to permit output coupling without interference with gyro operation, as is known in the art.

The anticlockwise output beams are reflected from the left side of the Faraday cell 22, to the mirror 10, and to a pair of mirrors 24, 26, and thence to a mode-combining beam splitter 28; the clockwise output beams are similarly reflected from the right side of the Faraday cell 22, to the mirror 11, and to a mirror 30, and thence to the mode-combining beam splitter 28. The beam splitter 28 is substantially 50% reflective from both sides so that essentially half of the anticlockwise output beams are transmitted to a quarter wave plate 32 and approximately half of the anticlockwise output beams are reflected to a quarter wave plate 34, similarly, approximately half of the clockwise output beams are transmitted to the quarter wave plate 34 and approximately half of the clockwise output beams are reflected to the quarter wave plate 32. In order to maintain the polarization state of the output waves essentially circular, the mirrors 24, 26 and 30 and the beam splitter 28 should be of high quality (such as dielectric-coated elements). The quarter wave plates 32, 34 convert the circular polarized waves to linearly polarized waves, in a manner which is well known in the art, to permit separating the orthogonal linear polarizations in polarization analyzers or filters 36, 38 so as to provide to each of the respective detectors 40, 42 only waves of similar polarization, thereby to cause each detector 40, 42 to be respectively responsive to a related pair of modes, providing a frequency difference therebetween corresponding to the output of one of the two gyros formed by the four modes of circulating waves. The electrical output of each detector 40, 42 is applied by suitable circuitry 44, 46 to a differencing circuit 48 which provides a system output 50 as a function of the difference in the frequency output of the two independent gyros, as is described more fully in the aforementioned Yntema et al and Ferrar patents. Although not shown in the FIGURE, certain other optical elements may be used, such as lenses to properly direct and refocus the beam prior to application to the detector.

As described briefly hereinbefore, reflection of circularly polarized electromagnetic radiation from a surface causes the orthogonality of the circular polarization to reverse: that is, right circularly polarized light becomes left circularly polarized upon reflection (and vice versa); therefore, an even number of reflections causes the orthogonality to be restored to the original orthogonality whereas an odd number of reflections causes the orthogonality to change.

In the drawing, the four modes are identified as 1, 2, 3 and 4. The clockwise or anticlockwise character of the wave is denoted by "A" or "C" respectively. And the polarization is identified as "L" for left circularly polarized, "R" for right circularly polarized, "V" for vertical linearly polarized, and "H" for horizontal linearly polarized. Thus, at the laser gain medium 16, under the notation of convention established in the aforementioned Yntema et al patent, the anticlockwise circulating waves include the highest frequency mode, 1AL, which is left circularly polarized; and the lowest frequency mode, 4AR, which is right circularly polarized; and the clockwise circulating waves include the second-highest frequency mode, 2CL, which is left circularly polarized, and the third-highest frequency mode, 3CR, which is right circularly polarized. The anticlockwise waves are reflected at the mirror 13, the mirror 10, the Faraday cell 22, and then, as output beams, at the mirrors 10, 24 and 26, which constitute an even number (six) of the reflections; and therefore, the anticlockwise modes approach the mode-combining beam splitter 28 with the same polarization as exists between the laser gain medium 16 and the mirror 13. Contrariwise, the clockwise circulating waves are reflected an odd number of times at the mirrors 12 and 11, the Faraday cell 22, and the mirrors 11 and 30, so that the polarization is reversed as the clockwise output waves approach the mode-combining beam splitter 28. However, since the mode 1 wave is to be combined with the mode 2 wave, and one of them will be reflected by the beam splitter 28 but the other will be transmitted by the beam splitter 28, modes 1 and 2 will have the same polarization in the colinear combined beams eminating both to the right and to the left of the beam splitter (that is, at both quarter wave plates 32, 34). Similarly, modes 3 and 4 will have the same polarization at both quarter wave plates 32, 34. Therefore, the configuration illustrated in the drawing provides the opportunity for extracting either polarity from either of the colinear output beams of the beam splitter 28, by choice of the orientation of the analyzers 36, 38.

Comparison of the clockwise waves (2CL, 3CR) between the laser gain medium structure 18 and the mirror 12 with the clockwise waves (2CR, 3CL) between the mirror 30 and the mode-combining beam splitter 28 shows that, in the embodiment of FIG. 1, the odd number of reflections in the output beam path for the counterclockwise waves has causes them to have a circular polarization at the beam splitter 28 (which is positioned where the two output beams cross or intersect with each other), in contrast with the circular polarization exhibited by the clockwise waves adjacent to the laser gain medium 16. On the other hand, comparison of the anticlockwise waves (1AL, 4AR) between the laser gain medium structure 18 and the mirror 13 with the anticlockwise waves (1AL, 4AR) between the mirror 26 and the mode-combining beam splitter 28 illustrates that the anticlockwise waves retain the same circular polarization at the beam splitter 28 as they exhibit adjacent to laser gain medium 16. Thus the two output beams are unlike in that one has retained its original two modes, while the two modes in the other has altered their direction of polarization. This feature of the invention allows placing the quarter wave plates 32, 34 on the output side of beam splitter 28 since the combination of transmission and reflection by the four modes in the beam splitter 28 provides mutually orthogonal polarizations between modes 1 and 2 (which are left circular polarized at the quarter wave plate 32 and right circularly polarized at the quarter wave plate 34) and modes 3 and 4 (which are right circularly polarized at the quarter wave plate 32 and which are left circularly polarized at the quarter wave plate 34). As is known, the quarter wave plates can be positioned so as to convert either orthogonality of circular polarization to either orthogonality of linear polarization. For exemplary discussion, it is assumed that the quarter wave plates 32, 34 are both adjusted to convert left circularly polarized waves to horizontal linear polarization, so that both polarization filters or analyzers 36, 38 can have the same orientation. This permits modular construction including the alignment of quarter wave plates and polarization filters without regard to which side of the laser gyro they are to be used in, both sides using identical structure. Naturally, if the quarter wave plates were rotated 90°, then the filters would similarly require rotation, or the orthogonal polarization would be detected. As used herein, it is assumed that the modularity of allowing both output means to be similarly oriented is of value; however, if one of the analyzers or filters 36, 38 is to be oriented in a manner orthogonal to the other, then, the quarter wave plate would similarly be adjusted; and as such, the filtering remains the same: that is, if left circularly polarized light is converted to horizontal and horizontal is passed, the result is the same as when left circularly polarized light is converted to vertical and vertical is passed. Therefore, as used herein, the conversion from one circular polarization to a filtered linear polarization is what is important, intended and referred to. This is achieved by having the relationship between one quarter wave plate and its related analyzer the same as the relationship between the other quarter wave plate and the other analyzer, regardless of the orientation of either combination with respect to the remainder of the gyro.

The polarization reversal function of one of the mirrors 24, 26 could be provided by a half-wave plate instead; in such case, the anticlockwise path will have only one mirror (eg 24) oriented much like the mirror 30, and the half-wave plate (not shown) will be placed between the mirrors 10 and 24, or between the mirror 24 and the beam splitter 28.

Thus, although the invention has been shown and described with respect to exemplary embodiments thereof, it should be understood by those skilled in the art that the foregoing and various other changes, omissions and additions may be made therein and thereto, without departing from the spirit and scope of the invention.

Having thus described typical embodiments of our invention, that which we claim as new and desire to secure by Letters Patent of the United States is:

1. In a method of operating a differential laser gyro in which the clockwise and anticlockwise waves of one polarization and the clockwise and anticlockwise waves of an orthogonal polarization are all combined in a mode-combining beam splitter to provide two output beams each having all four wave modes, circularly polarized waves are converted to linear polarization and the orthogonal polarizations are separated by linear polarization analyzers, and the clockwise and anticlockwise waves of each polarization are separately heterodyned, the steps of:
   reflecting the clockwise waves a number of times, and reflecting the anticlockwise waves a different number of times to direct said waves to the beam splitter;
   combining said waves in the beam splitter while in circularly polarized modes;
   converting the combined waves in both output beams provided by the beam splitter from circular polarization to linear polarization of the same respective orthogonality; and
   passing the linearly polarized waves through a pair of linear polarization analyzers disposed with the same orientation.

2. A differential laser gyro comprising:
   optical means for providing four modes of waves circulating about a closed-loop path at respectively distinct wavelength, including right circularly polarized and left circularly polarized waves circulating clockwise and right circularly polarized and left circularly polarized waves circulating anticlockwise, and for reflecting a portion of said clockwise circulating waves along a first output beam path and for reflecting a portion of said anticlockwise circulating waves along a second output beam path which intersects with said first output beam path, one of said output beam paths providing an odd number of reflections between said closed-loop path and the intersection of said output beam paths and the other of said output beam paths providing an even number of reflections between said closed-loop path and the intersection of said output beam paths;
   a mode-combining beam splitter disposed at the intersection of said two output beam paths to provide combined waves including all four modes along each of said output beam paths; and
   a pair of output means, each disposed along a corresponding one of said output beam paths on the output side of said beam splitter, each including a quarter wave plate and a linear polarization analyzer, for heterodyning waves of given linear polarization, the quarter wave plate and analyzer of each of said output means being of the same relative orientation as those of the other of said output means.

3. In a differential laser gyro comprising closed-loop optical path means, including a laser gain medium, an even number of beam directing mirrors, and means providing an anisotropic frequency responsive to waves circulating in opposite directions and an anisotropic refrequency response to waves of mutually orthogonal circular polarization, for providing four modes of circulating waves at respectively distinct wavelengths, including right circularly polarized and left circularly polarized waves circulating clockwise and right circularly polarized and left circularly polarized waves circulating anticlockwise, the improvement in which:
   said path means includes means for reflecting a portion of said clockwise circulating waves along a first output beam path and for reflecting a portion of said anticlockwise circulating waves along a second output beam path which intersects with said first output beam path; and comprising:
   a mode-combining beam splitter disposed at the intersection of said two output beam paths to provide combined waves including all four modes along each of said output beam paths;
   means, disposed in a portion of at least one of said output beam paths between said closed-loop optical path and said beam splitter, for providing an odd number of reflections in said portion of one of said output beam paths and to provide an even number of reflections in said portion of the other of said output beam paths;
   a pair of output means, one for each of said output beam paths, each including a linear polarization analyzer, for heterodyning waves of given linear polarization; and
   a pair of quarter wave plates, each disposed along a corresponding one of said paths between said beam splitter and the related one of said output means, each bearing the same relative orientation with respect to the corresponding one of said analyzers as the other.

4. A differential laser gyro comprising:

optical means for providing four modes of waves circulating about a closed-loop path at respectively distinct wavelength, including right circularly polarized and left circularly polarized waves circulating clockwise and right circularly polarized and left circularly polarized waves circulating anticlockwise, and for reflecting a portion of said clockwise circulating waves along a first output beam path and for reflecting a portion of said anticlockwise circulating waves along a second output beam path which intersects with said first output beam path, one of said output beam paths providing an odd number of polarization reversals between said closed-loop path and the intersection of said output beam paths and the other of said output beam paths providing an even number of polarization reversals between said closed-loop path and the intersection of said output beam paths;

a mode-combining beam splitter disposed at the intersection of said two output beam paths to provide combined waves including all four modes along each of said output beam paths; and a pair of output means, each disposed along a corresponding one of said output beam paths on the output side of said beam splitter, each including a quarter wave plate and a linear polarization analyzer, for heterodyning waves of given linear polarization, the quarter wave plate and analyzer of each of said output means being of the same relative orientation as those of the other of said output means.

* * * * *